United States Patent
Anthamatten et al.

(10) Patent No.: US 9,598,534 B2
(45) Date of Patent: Mar. 21, 2017

(54) SHAPE MEMORY POLYMERS AND METHODS OF MAKING AND USE THEREOF

(71) Applicants: Mitchell Anthamatten, Rochester, NY (US); Yuan Meng, Rochester, NY (US)

(72) Inventors: Mitchell Anthamatten, Rochester, NY (US); Yuan Meng, Rochester, NY (US)

(73) Assignee: The University of Rochester, Rochester, NY (US)

( * ) Notice: Subject to any disclaimer, the term of this patent is extended or adjusted under 35 U.S.C. 154(b) by 0 days.

(21) Appl. No.: 14/926,624

(22) Filed: Oct. 29, 2015

(65) Prior Publication Data

US 2016/0137778 A1  May 19, 2016

Related U.S. Application Data

(60) Provisional application No. 62/072,145, filed on Oct. 29, 2014.

(51) Int. Cl.
| | |
|---|---|
| C08F 2/46 | (2006.01) |
| C08G 61/04 | (2006.01) |
| C08G 63/91 | (2006.01) |
| C08J 3/24 | (2006.01) |
| C08J 3/28 | (2006.01) |

(52) U.S. Cl.
CPC ........... *C08G 63/912* (2013.01); *C08J 3/243* (2013.01); *C08J 3/28* (2013.01); *C08J 2367/04* (2013.01); *C08J 2367/07* (2013.01)

(58) Field of Classification Search
CPC ........... C08G 64/42; C08G 63/912; C08J 5/00
USPC ......................................... 522/149, 1; 520/1
See application file for complete search history.

(56) References Cited

U.S. PATENT DOCUMENTS

2010/0311861 A1* 12/2010 Clapper ............... C08F 238/00
  522/167

OTHER PUBLICATIONS

Singh npl, Mechanical and Thermo-Mechanical Studies of Double Networks Based on Thermoplastic Elastomers, 2010, Journal of Polymer Science: Part B: Polymer Physics, vol. 48, 778-789.*
Simon et al, A comparison of polymer substrates for photolithographic processing of flexible bioelectronics, Jul. 14, 2013, Biomed Microdevices, 15, 925-939.*
Ahir, S. V. et al., "Self-assembled shape-memory fibers of triblock liquid-crystal polymers", Adv Funct Mater 2006, 16 (4), 556-560.
Andrews, R. D. et al., "The theory of permanent set at elevated temperatures in natural and synthetic rubber vulcanizates", J Appl Phys 1946, 17 (5), 352-361.
Anthamatten, M. et al., "Energy storage capacity of shape-memory polymers", Macromolecules 2013, 46 (10), 4230-4234.
Behl, M. et al., "Reversible bidirectional shape-memory polymers", Adv Mater 2013, 25 (32), 4466-4469.
Berg, G. J. et al., "New directions in the chemistry of shape memory polymers", Polymer 2014, 55 (23).
Brommel, F. et al., "Preparation of liquid crystalline elastomers", Adv Polym Sci 2012, 250, 1-48.
Chatani, S. et al., "Triple shape memory materials incorporating two distinct polymer networks formed by selective thiol-michael addition reactions", Macromolecules 2014, 47 (15), 4949-4954.
Chatterjee, T. et al., "Hierarchical polymer-nanotube composites", Adv Mater 2007, 19 (22), 3850-3853.
Chen, S. J. et al., "Properties and mechanism of two-way shape memory polyurethane composites", Compos Sci Technol 2010, 70 (10), 1437-1443.
Chung, T. et al., "Clinical Comparison of the Auditory Steady-State Response with the Click Auditory Brainstem Response in Infants", Clin Exp Otorhinolaryngol 2008, 1 (4), 184-188.
Floudas, G. et al., "Shear-induced crystallization of poly(epsilon-caprolactone). 2. Evolution of birefringence and dichroism", Macromolecules 2000, 33 (17), 6466-6472.
Huang, W. M. et al., "Water-driven programmable polyurethane shape memory polymer: Demonstration and mechanism", Appl Phys Lett 2005, 86 (11), 114105-114105-3.
Kamal, T. et al., "Uniaxial tensile deformation of poly(epsilon-caprolactone) studied with saxs and waxs techniques using synchrotron radiation", Macromolecules 2012, 45 (21), 8752-8759.
Kramer, O. et al., "Entanglement networks of 1,2-polybutadiene crosslinked in states of strain .1. Crosslinking at 0 degrees" Macromolecules 1974, 7 (1), 79-84.
Lendlein, A. et al., "Light-induced shape-memory polymers", Nature 2005, 434 (7035), 879-882.
Luo, X. F. et al., "Triple-shape polymeric composites (tspcs)", Adv Funct Mater 2010, 20 (16), 2649-2656.
Luo, Y. W. et al., "A general approach towards thermoplastic multishape-memory polymers via sequence structure design", Adv Mater 2013, 25 (5), 743-748.
Mohr, R. et al., "Initiation of shape-memory effect by inductive heating of magnetic nanoparticles in thermoplastic polymers", P Natl Acad Sci U.S.A. 2006, 103 (10), 3540-3545.
Ohm, C. et al., "Liquid crystalline elastomers as actuators and sensors", Adv Mater 2010, 22 (31), 3366-3387.
Roland, C. M. et al., "Orientation effects in rubber double networks", Rubber Chem Technol 1990, 63 (2), 285-297.
Singh, N. K. et al., "Mechanical and thermo-mechanical studies of double networks based on thermoplastic elastomers", J Polym Sci Pol Phys 2010, 48 (7).

(Continued)

*Primary Examiner* — Ling Choi
*Assistant Examiner* — Jessica E Whiteley
(74) *Attorney, Agent, or Firm* — Meunier Carlin & Curfman LLC

(57) ABSTRACT

Described are shape memory polymers and methods of making shape memory polymers and actuators from the shape memory polymers.

15 Claims, 7 Drawing Sheets

(56) References Cited

OTHER PUBLICATIONS

Singh, N. K. et al., "A Physical and mechanical study of pre-stressed competitive double network thermoplastic elastomers", Macromolecules 2011, 44, 1480-1490.
Spruiell, J. E. et al., "The specification of orientation and its development in polymer processing", Polymer Engineering and Science 1982, 23 (5), 247-256.
Torbati, A. H. et al., "Properties of triple shape memory composites prepared via polymerization-induced phase separation", Soft Matter 2014, 10 (17), 3112-3121.
Twardowski, T. et al., "Elastic contributions from chain entangling and chemical cross-links in elastomer networks in the small-strain limit", Macromolecules 1991, 24 (21), 5769-5771.
Westbrook, K. K. et al., "Two-way reversible shape memory effects in a free-standing polymer composite", Smart Mater Struct 2011, 20 (6).
Xie, T., "Tunable polymer multi-shape memory effect", Nature 2010, 464 (7286), 267-270.
Zhao, Y. et al., "Crystallization under strain and resultant orientation of poly(epsilon-caprolactone) in miscible blends", Macromolecules 1999, 32 (4), 1218-1225.
Zotzmann, J. et al., "Reversible triple-shape effect of polymer networks containing polypentadecalactone- and poly(epsilon-caprolactone)-segments", Adv Mater 2010, 22 (31), 3424-3429.

\* cited by examiner

SHAPE MEMORY POLYMERS AND METHODS OF MAKING AND USE THEREOF

CROSS REFERENCE TO RELATED APPLICATIONS

This application claims benefit of U.S. Provisional Patent Application No. 62/072,145, filed Oct. 29, 2014, which is hereby incorporated herein by reference in its entirety.

BACKGROUND

Shape-memory polymers (SMPs) are polymers that can switch between different shapes upon the application of an external stimulus, such as heat. For example, a thermal-responsive shape-memory effect can be achieved by cooling an elastically deformed material through a thermoreversible transition that bolsters its internal cohesive energy density, thereby fixing the temporary shape. Upon heating, stored elastic energy can be released and the material recovers its original shape, resulting in what is called one-way shape-memory (Anthamatten M et al. *Macromolecules* 2013, 46 (10), 4230-4234). In recent years, the engineering of SMPs has become incredibly sophisticated (see e.g., Xie T. *Nature* 2010, 464 (7286), 267-270; Luo Y W et al. *Adv Mater* 2013, 25 (5), 743-748; Luo X F and Mather P T. *Adv Funct Mater* 2010, 20 (16), 2649-2656; Torbati A H et al. *Soft Matter* 2014, 10 (17), 3112-3121; Chatani S et al. *Macromolecules* 2014, 47 (15), 4949-4954; Zotzmann J et al. *Adv Mater* 2010, 22 (31), 3424-3429). SMP action can now be triggered by various stimuli such as light, moisture, or applied magnetic fields (Huang W M et al. *Appl Phys Lett* 2005, 86 (11); Mohr R et al. *PNAS USA* 2006, 103 (10), 3540-3545; Lendlein A et al. *Nature* 2005, 434 (7035), 879-882). However, many potential applications (e.g., artificial muscles and actuators) are constrained by one-way shape-memory; in other words, many conventional SMPs do not return to their temporary shape upon re-cooling, and they must be reprogrammed each cycle.

Two-way shape memory is the ability to reversibly cycle between two different shapes. Strain-induced crystallization of polymers has been used to create two-way shape memory at different temperatures (Zotzmann J et al. *Adv Mater* 2010, 22 (31), 3424-3429; Chung T et al. *Macromolecules* 2008, 41 (1), 184-192). However, an external load is typically required to direct crystallization along a preferred direction. Other two-way shape actuators have been created by joining a layer of pre-elongated shape memory polymer with a layer of unstretched elastomer (Chen S J et al. *Compos Sci Technol* 2010, 70 (10), 1437-1443; Westbrook K K et al. *Smart Mater Struct* 2011, 20 (6), 065010). The resulting composites have built-in stress that directs crystallization in the shape memory layer, resulting in bending actuation upon thermal cycling. Behl et al. have demonstrated free-standing copolymer networks, with two phase-separated crystallizable domains, that are capable of reprogrammable and reversible bending (Behl M et al. *Adv Mater* 2013, 25 (32), 4466-4469). In their approach, one set of crystallizable domains determines the shape-shifting geometry while the other provides the thermally-controlled actuation capability.

Despite these advances new SMPs are still needed. For example, shape memory polymers that have two-way shape memory, even without external loads or the need for additional layers or phases, would be desirable. The methods and compositions disclosed herein address these and other needs.

SUMMARY

In accordance with the purposes of the disclosed methods, as embodied and broadly described herein, the disclosed subject matter relates to compositions and methods of making and using the compositions. More specifically, according to the aspects illustrated herein, there are provided shape memory polymers and methods of making shape memory polymers and actuators from the shape memory polymers.

According to further aspects illustrated herein, there are provided methods for forming shape memory polymers that comprise partially crosslinking a prepolymer to form a partially crosslinked polymer; stretching the partially crosslinked polymer to form a stretched partially crosslinked polymer; and further crosslinking the stretched, partially crosslinked polymer, thereby making the shape memory polymer.

Also provided herein are methods of making shape memory polymers that comprise partially crosslinking a prepolymer to form a partially crosslinked polymer having a pre-stretched length, wherein the prepolymer has reactive groups and at least a portion of the reactive groups remain uncrosslinked in the partially crosslinked polymer; stretching the partially crosslinked polymer to form a stretched, partially crosslinked polymer with a post-stretched length; and crosslinking the stretched, partially crosslinked polymer to form the shape memory polymer.

Also provided herein are methods of making actuators that comprise partially crosslinking a prepolymer to form a partially crosslinked polymer having a pre-stretched length, wherein the prepolymer has reactive groups and at least a portion of the reactive groups remain uncrosslinked in the partially crosslinked polymer; stretching the partially crosslinked polymer to form a stretched, partially crosslinked polymer having a post-stretched length, wherein stretching comprises applying a load to the partially crosslinked polymer; crosslinking the stretched, partially crosslinked polymer to form a shape memory polymer; and removing the load from the shape memory polymer, thereby making an actuator having a loadless length.

Also disclosed herein are methods of thermally actuating an actuator having a loadless length that comprises cooling the actuator to a first temperature to elongate the actuator to an elongated length; heating the actuator to a second temperature to contract the actuator to the loadless length; wherein the actuator comprises a shape memory polymer formed by: partially crosslinking a prepolymer to form a partially crosslinked polymer having a pre-stretched length, wherein the prepolymer has reactive groups and at least a portion of the reactive groups remain uncrosslinked in the partially crosslinked polymer; stretching the partially crosslinked polymer to form a stretched, partially crosslinked polymer having a post-stretched length, wherein stretching the partially crosslinked polymer comprises applying a load; further crosslinking the stretched, partially crosslinked polymer to form the shape memory polymer; and removing the load from the shape memory polymer, thereby making the actuator with the loadless length; wherein the actuator is formed at a temperature above the melting temperature of the shape memory polymer; wherein the first temperature is below the melting temperature of the shape memory polymer; and wherein the second temperature is above the melting temperature of the shape memory polymer.

Also disclosed herein are shape memory polymers that comprise the photocrosslinked product of a stretched, partially crosslinked polymer, the stretched partially crosslinked polymer having a post-stretched length; wherein the stretched partially crosslinked polymer comprises the product of stretching a partially crosslinked polymer having a pre-stretched length; and wherein the partially crosslinked polymer comprises the partially crosslinked product of a prepolymer comprising reactive groups, wherein at least a portion of the reactive groups remain uncrosslinked in the partially crosslinked polymer.

Also disclosed herein are actuators that have a loadless length, the actuator comprising a shape memory polymer as disclosed herein.

Additional advantages will be set forth in part in the description that follows or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects described below.

In FIG. 4, top panel (a), there are a group of photographs of a specimen with a gauge length of 8.3 cm (dot) measured at 70° C. under no external load, which elongated to 9.7 cm upon cooling to 40° C., and reversibly returned to its initial length upon heating back to 70° C. The white part on bottom end of the sample is the grip used to hold the sample during the test. The grip does not show actuation behavior. FIG. 4, bottom panel (b), is a graph showing the evolution of tensile extension over five cooling-heating cycles, showing 14% actuation; this specimen's initial length was determined to be 4.7 cm at 70° C.

DETAILED DESCRIPTION

Figure 1:
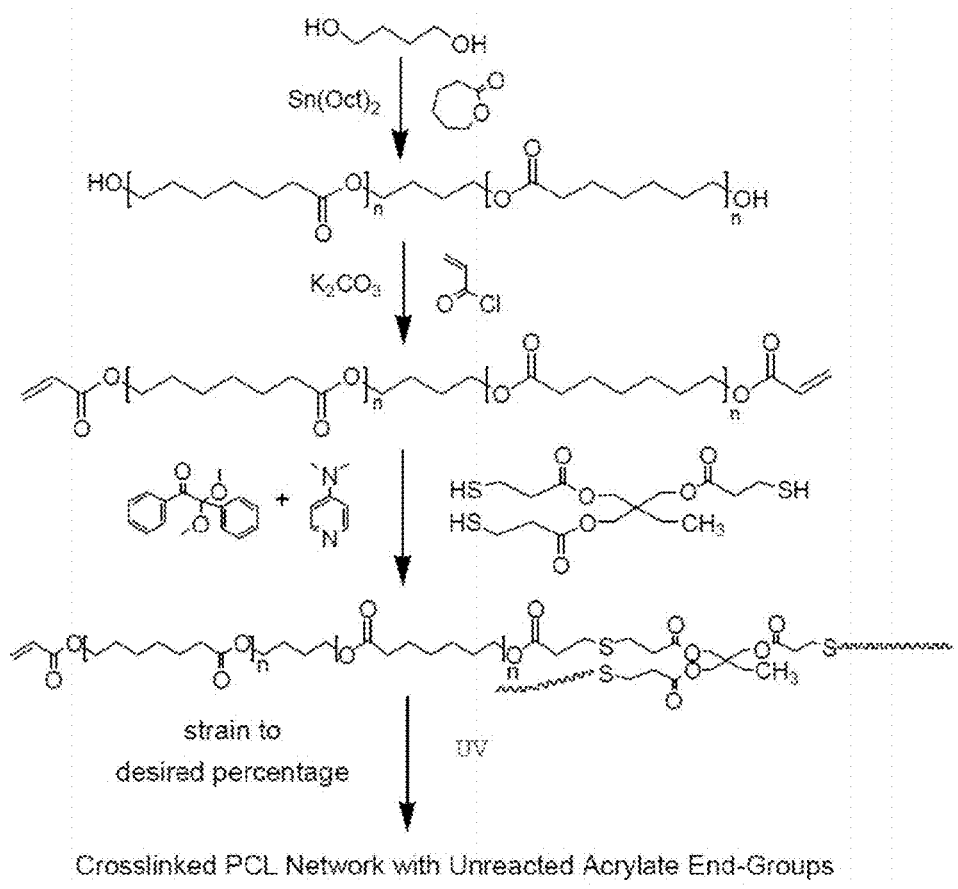
FIG. 1 is a synthetic scheme for preparing a duel-crosslinked PCL network actuator.

The methods and compositions described herein may be understood more readily by reference to the following detailed description of specific aspects of the disclosed subject matter and the Examples and Figures included therein.

Before the present methods and compositions are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

"Optional" or "optionally" means that the subsequently described event or circumstance can or cannot occur, and that the description includes instances where the event or circumstance occurs and instances where it does not.

It is understood that throughout this specification the identifiers "first" and "second" are used solely to aid the reader in distinguishing the various components, features, or steps of the disclosed subject matter. The identifiers "first" and "second" are not intended to imply any particular order, amount, preference, or importance to the components or steps modified by these terms.

Disclosed herein are methods of making shape memory polymers. The disclosed methods can comprise partially crosslinking a prepolymer to form a partially crosslinked polymer; stretching the partially crosslinked polymer along a direction to form a stretched partially crosslinked polymer; and further crosslinking the stretched, partially crosslinked polymer, thereby making the shape memory polymer.

The term prepolymer is used herein to refer to a polymer before it has undergone partial crosslinking as disclosed herein. It is not meant to imply that the prepolymer is not yet a polymer (e.g., a monomer or polymer precursor). Rather a prepolymer is meant to refer to a polymer that has reactive groups that are available for bond forming reactions that will crosslink (intermolecular and/or intramolecular crosslink). In some examples, the prepolymer used herein can comprise a semi-crystalline polymer. Examples of semi-crystalline polymers include, but are not limited to, polyethylene, polyethylene terephthalate, polytetrafluoroethylene, isotactic polypropylene, polyphenylene sulfide, polyetherketone, polyetheretherketone, polyphthalamide, polyetherketoneketone, thermoplastic polyimide, polybutylene terephthalate, polyoxymethylene, nylon, polyesters, polyethers (e.g., polyethelene glycol, polypropylene glycol, polytetramethylene glycol, polytetramethylene ether glycol, polyoxymethylene, polyethylene oxide, polypropylene oxide, polytetrahydrofuran, polyphenyl ether) poly(caprolactone), and copolymers thereof. In some examples, the prepolymer used herein can comprise a polymer that can undergo stress and/or strain induced crystallization. Examples of polymers that can undergo stress and/or strain induced crystallization include, but are not limited to, natural rubber, polyisoprene, poly(chloroprene), polyethylene glycol, poly(tetrahydrofuran), and poly(caprolactone). In some examples, the prepolymer can comprise a polymer with a melting point below room temperature. In some specific examples, the prepolymer can comprise poly(caprolactone).

The prepolymer has reactive groups that are available for bond formation; that is, the prepolymer can be crosslinked when the reactive groups on separate prepolymers or on the same prepolymer form a bond with a multivalent crosslinking agent. Examples of reactive groups on a suitable prepolymer include nucleophilic groups or electrophilic groups. Specific examples of nucleophilic reactive groups include thiols (sulfide), amines, azides, nitrites, alcohols (alkoxide), peroxides, carboxylic acids (carboxylate), thiocarboxylic acids (thiocarbonate), sulfonic acids (sulfoxide), and phosphonic acids (phosphates), where the deprotonated form of the reactive group is noted in parenthesis. Enolates can also be suitable nucleophilic reactive groups.

Specific examples of electrophilic reactive groups can comprise ketones, aldehydes, acyl halides, acrylates, carboxylic acids, esters, hemiacetal, acetals, hemiketal, ketal, orthoesters, amides, imines, imides, azo compounds, cyanates, thiocyanates, nitrates, nitriles, nitrites, thials, phosphines, and phosphodiesters. In some examples, the electrophilic reactive groups can comprise a Michael acceptor, which is an $\alpha,\beta$-unsaturated carbonyl, e.g., a (meth) acrylate group.

Other suitable reactive groups can be unsaturated moieties that can undergo a cycloaddition reaction, e.g., an alkene, alkyne, diene, nitrile, azide, carbonyl, imine, or hydroxamic acid.

Partially crosslinking the prepolymer can occur by any suitable crosslinking reaction that leaves at least a portion of the prepolymer uncrosslinked; that is, at least a portion of the reactive groups on the prepolymer participate in the partial crosslinking reaction and the remaining portion of reactive end groups do not, remaining available for the crosslinking reaction at a later stage of the disclosed methods. By partial crosslinking is meant that less than 100% of the reactive groups on the prepolymer undergo a reaction and form a bond. In particular, the partial crosslinking reaction can result in less than 95%, 90%, 85%, 80%, 75%, 70%, 65%, 60%, 55%, 50%, 45%, 40%, 35%, 30%, 25%, 20%, 15%, 10%, or 5% of the reactive groups undergo a bond forming, crosslinking reaction. In many examples, however, the partial crosslinking reaction results in from 30 to 70, from 40 to 60, or about 50% of the reactive groups undergoing a bond forming reaction. The amount of crosslinking, and thus the amount of reactive groups in the prepolymer involved in reactions, can be controlled by selecting the desired amount of crosslinking agent. That is, the stoichiometry of the reagents can be used to dictate the extent of crosslinking. The amount of crosslinking can be monitored by various analytical techniques, such as TLC, IR spectroscopy, and NMR.

Examples of crosslinking reactions include, but are not limited to, photocuring, free radical polymerization, cationic polymerization, anionic polymerization, coordination polymerization, ring-opening polymerization, chain-growth polymerization, chain transfer polymerization, emulsion polymerization, ionic polymerization, solution polymerization, step-growth polymerization, suspension polymerization, radical polymerization, condensation reactions, cycloaddition reactions, electrophilic additions, and nucleophilic additions (e.g., Michael additions). In some examples, partially crosslinking the prepolymer can comprise a Michael addition. In some examples, the prepolymer can comprise (meth)acrylate groups and partially crosslinking the prepolymer can comprise base-catalyzed Michael addition of the (meth)acrylate groups of the polymer and nucleophile (e.g., thiol, alcohol, or amine). In some examples, the nucleophile is a multivalent nucleophile, which contains more than one nucleophile. A specific example, includes a multivalent thiol.

After the partial crosslinking, the resulting partially crosslinked polymer can be purified and/or isolated.

Stretching the partially crosslinked polymer can be accomplished by standard techniques. In some examples, stretching the partially crosslinked polymer can comprise applying a stretching load. While under the stress of stretching, the partially crosslinked polymer can again be crosslinked by any suitable crosslinking reaction. Thus, the remaining reactive groups (or a portion thereof) in the partially crosslinked polymer can undergo a crosslinking reaction, thereby forming additional crosslinks. Examples of further crosslinking reactions include bond forming reactions brought about by electron beams, irradiation, heat or chemical additives. In some examples, the chemical additives can be activated upon exposure to irradiation. In some examples, the crosslinking can comprise photocrosslinking, for example UV curing, with or without a photoinitiator. Examples of photoinitiators include, but are not limited to, azobisisobutyronitrile, benzoyl peroxide, 2,2-dimethoxy-2-phenylacetophenone (DMPA), and camphorquinone. In some examples, further crosslinking the stretched, partially crosslinked polymer can comprise photocrosslinking with UV irradiation in the presence of a photoinitiator. The resulting shape memory polymer can be directionally biased along the direction the partially crosslinked polymer was stretched and then crosslinked.

The partially crosslinked polymer can have a pre-stretched length and a post-stretched length. The post-stretched length can be greater than the pre-stretched length. The partially crosslinked polymer can be stretched to any point up to the breaking point, meaning the post-stretched length can be longer than the pre-stretched length by any amount, up to the length where the partially crosslinked polymer breaks. For example, a sample of partially crosslinked poly(caprolactone) with a pre-stretched length of 10 mm broke when stretched to over 1000%, meaning the post-stretched length of the sample can be from greater than 10 mm to 110 mm.

In some examples, the post-stretched length can be longer than the pre-stretched length by greater than 0% (e.g., 25% or more, 50% or more, 75% or more, 100% or more, 125% or more, 150% or more, 175% or more, 200% or more, 225% or more, 250% or more, 275% or more, 300% or more, 325% or more, 350% or more, 375% or more, 400% or more, 425% or more, 450% or more, 475% or more, 500% or more, 525% or more, 550% or more, 575% or more, 600% or more, 625% or more, 650% or more, 675% or more, 700% or more, 725% or more, 750% or more, 775% or more, 800% or more, 825% or more, 850% or more, 875% or more, 900% or more, 925% or more, 95% or more, or 975% or more). In some examples, the post-stretched length can be longer than the pre-stretched length by 1000% or less (e.g., 975% or less, 950% or less, 925% or less, 900% or less, 875% or less, 850% or less, 825% or less, 800% or less, 775% or less, 750% or less, 725% or less, 700% or less, 675% or less, 650% or less, 625% or less, 600% or less, 575% or less, 550% or less, 525% or less, 500% or less, 475% or less, 450% or less, 425% or less, 400% or less, 375% or less, 350% or less, 325% or less, 300% or less, 275% or less, 250% or less, 225% or less, 200% or less, 175% or less, 150% or less, 125% or less, 100% or less, 75% or less, 50% or less, or 25% or less). The amount that post-stretched length is longer than the pre-stretched length can range from any of the minimum values described above to any of the maximum values described above, for example from greater than 0% to 1000% (e.g., from 50% to 950%, from 100% to 900%, from 150% to 850%, from 200% to 800%, from 250% to 750%, from 300% to 700%, from 350% to 650%, from 400% to 600%, from 450% to 550%, from 25% to 500%, or from 500% to 1000%). In some examples, the post-stretched length can be longer than the pre-stretched length by 200%, 350%, 550%, 650%, or 750%.

In some examples, the method can further comprise removing the stretching load from the shape memory polymer, resulting in a state-of-ease that can be characterized by the loadless length. In some examples, removing the stretching load from the shape memory polymer can result in an actuator having the loadless length. As used herein, an actuator comprises a device that can be triggered by an external stimulus, such as heat, into motion, such as stretching or elongation or contraction. In some examples, the loadless length is between the pre-stretched length and the post-stretched length.

In some examples, the method can occur at a temperature above the melting temperature of the shape memory polymer.

In some examples, the method can occur at room temperature, meaning the partially crosslinked polymer can be cold-drawn, causing stress induced crystallization, and then further crosslinked at room temperature.

Also contemplated herein are additional crosslinking steps. While not wishing to be bound by theory, it is believed that forming covalent crosslinks at different strain states, a multi-way shape-memory polymer can be achieved. Thus, the crosslinking of the stretched, partially crosslinked polymer can also be a partial crosslinking (e.g., to form a partially crosslinked polymer), the result of which can then be stretched again to a different length and crosslinked. There can thus be three crosslinking reactions at different stretch or strain states. Additional crosslinkings at different stress or strain states can also be performed, resulting in repeating the stretch and crosslink process 3, 4, 5, or more times.

In some examples, the method can further comprise cooling the actuator to a temperature below the melting temperature of the shape memory polymer. In some examples, cooling the actuator to a temperature below the melting temperature of the shape memory polymer can elongate the actuator along the direction to an elongated length. In some examples, the elongation of the actuator can occur without the application of an external/stretching load.

In some examples, the elongated length can be longer than the loadless length by greater than 0% (e.g., 0.1% or more, 0.2% or more, 0.3% or more, 0.4% or more, 0.5% or more, 0.6% or more, 0.7% or more, 0.8% or more, 0.9% or more, 1.0% or more, 1.5% or more, 2% or more, 2.5% or more, 3% or more, 3.5% or more, 4% or more, 4.5% or more, 5% or more, 5.5% or more, 6% or more, 6.5% or more, 7% or more, 7.5% or more, 8% or more, 8.5% or more, 9% or more, 9.5% or more, 10% or more, 10.5% or more, 11% or more, 11.5% or more, 12% or more, 12.5% or more, 13% or more, 13.5% or more, 14% or more, 14.5% or more, 15% or more, 16% or more, 17% or more, 18% or more, 19% or more, 20% or more, 22% or more, 24% or more, 26% or more, 28% or more, 30% or more, 35% or more, 40% or more, or 45% or more). In some examples, the elongated length can be longer than the loadless length by greater than 50% or less (e.g., 45% or less, 40% or less, 35% or less, 30% or less, 28% or less, 26% or less, 24% or less, 22% or less, 20% or less, 19% or less, 18% or less, 17% or less, 16% or less, 15% or less, 14.5% or less, 14% or less, 13.5% or less, 13% or less, 12.5% or less, 12% or less, 11.5% or less, 11% or less, 10.5% or less, 10% or less, 9.5% or less, 9% or less, 8.5% or less, 8% or less, 7.5% or less, 7% or less, 6.5% or less, 6% or less, 5.5% or less, 5% or less, 4.5% or less, 4% or less, 3.5% or less, 3% or less, 2.5% or less, 2% or less, 1.5% or less, 1% or less, 0.9% or less, 0.8% or less, 0.7% or less, 0.6% or less, 0.5% or less, 0.4% or less, 0.3% or less, 0.2% or less, or 0.1% or less). The amount the elongation length is longer than the loadless length can range from any of the minimum values described above to any of the maximum values described above, for example from greater than 0% to 50% longer than the loadless length (e.g., from greater than 0% to 45%, from greater than 0% to 40%, from greater than 0% to 35%, from greater than 0% to 30%, from greater than 0% to 20%, from 15% to 50%, from 1% to 15%, from 2% to 14%, from 1% to 6% from 1% to 3%, from 3% to 6%, from 6% to 15%, from 6% to 9%, from 9% to 12%, or from 12% to 15%).

The disclosed methods can further comprise heating the actuator to a temperature above the melting temperature of the shape memory polymer, thereby contracting the actuator along the direction to the loadless length.

In some examples, the method can further comprise cooling the actuator to a temperature below the melting temperature of the shape memory polymer, thereby elongating the actuator along the direction to the elongated length.

In some examples, the method can comprise repeatedly heating the actuator to a temperature above the melting temperature of the shape memory polymer, thereby contracting the actuator along the direction to the loadless length, and cooling the actuator to a temperature below the melting temperature of the shape memory polymer, thereby elongating the actuator along the direction to the elongated length.

Also disclosed herein are methods of making shape memory polymers comprising: partially crosslinking a prepolymer to form a partially crosslinked polymer having a pre-stretched length, wherein the prepolymer comprises reactive groups and at least a portion of the reactive groups of the prepolymer remain uncrosslinked in the partially crosslinked polymer; stretching the partially crosslinked polymer to form a stretched, partially crosslinked polymer with a post-stretched length; and further crosslinking the stretched, partially crosslinked polymer to form the shape memory polymer.

Also disclosed herein are methods of making shape memory polymers comprising: providing a polymer with photosensitive crosslinks and permanent crosslinks; stretching and heating the polymer; and irradiating the stretched and heated polymer, to thereby reshuffle the photosensitive crosslinks.

Also disclosed herein are methods of making actuators comprising: partially crosslinking a prepolymer to form a partially crosslinked polymer having a pre-stretched length, wherein the prepolymer comprises reactive groups and at least a portion of the reactive groups remain uncrosslinked in the partially crosslinked polymer; stretching the partially crosslinked polymer to form a stretched, partially crosslinked polymer having a post-stretched length, wherein stretching comprises applying a load to the partially crosslinked polymer; further crosslinking the stretched, partially crosslinked polymer to form a shape memory polymer; and removing the load from the shape memory polymer, thereby making an actuator having a loadless length.

Also disclosed herein are methods of thermally actuating an actuator having a loadless length, the method comprising: cooling the actuator to a first temperature to elongate the actuator along a direction to an elongated length; heating the actuator to a second temperature to contract the actuator along the direction to the loadless length; wherein the actuator comprises a shape memory polymer formed by: partially crosslinking the reactive end groups of a prepolymer to form a partially crosslinked polymer having a pre-stretched length, wherein at least a portion of the reactive groups of the prepolymer remain uncrosslinked in the partially crosslinked polymer; stretching the partially crosslinked polymer to form a stretched, partially crosslinked polymer having a post-stretched length, wherein stretching the partially crosslinked polymer comprises applying a load; further crosslinking the stretched, partially crosslinked polymer to form the shape memory polymer; and removing the load from the shape memory polymer, thereby making the actuator with the loadless length; wherein the actuator is formed at a temperature above the melting temperature of the shape memory polymer; wherein the first temperature is below the melting temperature of the shape memory polymer; and wherein the second temperature is above the melting temperature of the shape memory polymer.

Also disclosed herein are shape memory polymers. In some examples, the shape memory polymers can comprise the photocrosslinked product of a stretched partially crosslinked polymer, the stretched, partially crosslinked polymer having a post-stretched length; wherein the stretched, partially crosslinked polymer comprises the product of stretching a partially crosslinked polymer having a pre-stretched length along a direction; and wherein the partially crosslinked polymer comprises the partially crosslinked product of a prepolymer comprising reactive groups, wherein at least a portion of the reactive groups of the prepolymer remain uncrosslinked in the partially crosslinked polymer.

Also disclosed herein are actuators. In some examples, the actuator can have a loadless length, the actuator comprising a shape memory polymer of with a load removed; wherein the shape memory polymer comprises the photocrosslinked product of a stretched, partially crosslinked polymer, the stretched, partially crosslinked polymer having a post-stretched length; wherein the stretched, partially crosslinked polymer comprises the product of stretching a partially crosslinked polymer having a pre-stretched length by applying a load; and wherein the partially crosslinked polymer comprises the partially crosslinked product of a prepolymer comprising reactive groups, wherein at least a portion of the reactive groups of the prepolymer remain uncrosslinked in the partially crosslinked polymer.

The examples below are intended to further illustrate certain aspects of the methods and compounds described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process.

ε-caprolactone (CL), and 1,4-butandiol were purchased from Sigma-Aldrich and were distilled before use. All the other chemicals were obtained from Sigma-Aldrich and were used as received. NMR spectra were acquired on a Brüker AVANCE-III 400 NMR Spectrometer system operating at 400.13 MHz for $^1$H observation. Attenuated total-reflection Fourier transform infrared (FT-IR) spectroscopy (Shimadzu 8000S) was used to assess the presence of acrylate end-groups near the sample surface. Molecular weight and polydispersity were measured by gel permeation chromatography (PolyAnalytik PAS103-L and PAS104-L GPC columns and Viscotek TPA301 detector) using THF as an eluent and polystyrene standards. Thermo-mechanical analysis was performed using an MTS QT/5, equipped with a custom-built heating chamber, and was applied to characterize the shape actuation prepared Stage II samples. Two-dimensional wide angle X-ray scattering were performed on Brüker General Area Detector Diffraction System (GADDS), with a highly collimated 1 mm diameter beam and Brüker HI-STAR area detector. Differential scanning calorimetry was performed using a TA instrument, Q2000 DSC. Five to six mg samples were placed in a hermetically sealed pan and subjected to heating and cooling at 5° C./min over the temperature range of −30° C. to 100° C.

Example 1

Disclosed is a single phase, two-way shape actuator that, in the absence of an external load, elongates upon cooling and reversibly contracts upon heating. A partially cross-linked, semicrystalline poly(ε-caprolactone) (PCL) network is stretched to several hundred percent strain, and further crosslinked. Upon removal of the applied load, the elastomer adopts a "state-of-ease" that retains part of its former strain. When cooled, internal stress-induced crystallization causes further elongation; and when heated, crystallites melt, and the sample returns to its equilibrium state-of-ease. Under certain conditions, reversible actuation of over 15% strain can be reproducibly achieved, and samples can be cycled multiple times with highly uniform actuation and no observable creep. The microscopic scenario giving rise to the bidirectional shape switching was elucidated by X-ray scattering.

The chemical synthesis to achieve Stage II elastomer is shown in FIG. 1 and proceeded along four steps involving: ring-opening polymerization, nucleophilic acyl substitution, thiol-acrylate Michael Addition and photo-initiated polymerization.

The hydroxyl-terminated, linear poly(ε-caprolactone) (PCL) was synthesized by ring-opening polymerization of ε-caprolactone (CL) in the presence of SnOct$_2$ as catalyst and 1,4-butandiol as bifunctional initiator. To a 100 mL flask, distilled CL (40.0 g, 43 eq), 1,4-butandiol (737.8 mg, 1 eq) and SnOct$_2$ (77.2 mg, 0.02 eq) were added. The reaction was carried out in bulk at 120° C. under continuous N$_2$ purge for 24 hours. The resultant PCL polymer was purified through precipitation into methanol and vacuum dried at 60° C. overnight. Yield 98%. Molecular weight of the obtained prepolymer was determined to be 7000 g/mol (NMR end-group analysis) and PDI was 1.15 (GPC).

The hydroxyl terminated prepolymer was acrylated by nucleophilic substitution with acryloyl chloride to form acrylate terminated prepolymer. Freshly distilled toluene and potassium carbonate (3.84 g, 5 eq) were added to PCL-diol (35.0 g, 1 eq) under N$_2$ at 0° C. After 30 minutes of degassing with N$_2$, acryloyl chloride (2.25 mL, 2.51 g, 5 eq) was added dropwise over two hours. The reaction was warmed to 80° C. and allowed to stir for 48 hours. The mixture was filtered and the liquid fraction was precipitated into methanol to afford a white powder. The product was vacuum-dried at 60° C. overnight. Yield 95.2%. NMR suggested a molecular weight of 7300 g/mol and complete end-group conversion while GPC showed a polydispersity of 1.18.

Stage I networks were prepared by thiol-acrylate Michael addition between trimethylolpropane tris(3-mercaptopropionate) (107.3 mg, 1.33 eq) and linear PCL telechelic diacrylates (3.5 g, 2.5 eq), in the presence of 4-dimethylami-mopyridine (DMAP) (35 mg, 1 wt %) as base catalyst and in the presence of photo-initiator (2,2-Dimethoxy-2-phenylacetophenone, DMPA) (35 mg, 1 wt %) for Stage II crosslinking. Reagents were mixed such that acrylate end-groups were in 20% stoichiometric excess, in order to achieve a partially crosslinked network with dangling chain ends. The elastomer was crosslinked at 60° C. for 48 hours between two glass slides that were separated by a 0.8 mm thick Teflon spacer.

The aforementioned Stage I sample was cut using a trim die according to ASTM D638-Type 5 (gauge length=7.62 mm) The obtained dogbone-shaped Stage I elastomers were strained to desired extension ratio (0%, 200%, 350%, 550%, 650% and 750%) using MTS and fixed for curing. Photo-crosslinking of stretched samples was conducted using a mercury lamp (Oriel Arc Lamp Supply 66002, Oriel Corp.). Samples were crosslinked under 325 nm UV light for 3 hours at a delivered intensity of 0.8 mW/cm$^2$. Crosslinking was performed at 60° C., in order to afford enough dangling chain mobility.

Figure 2:
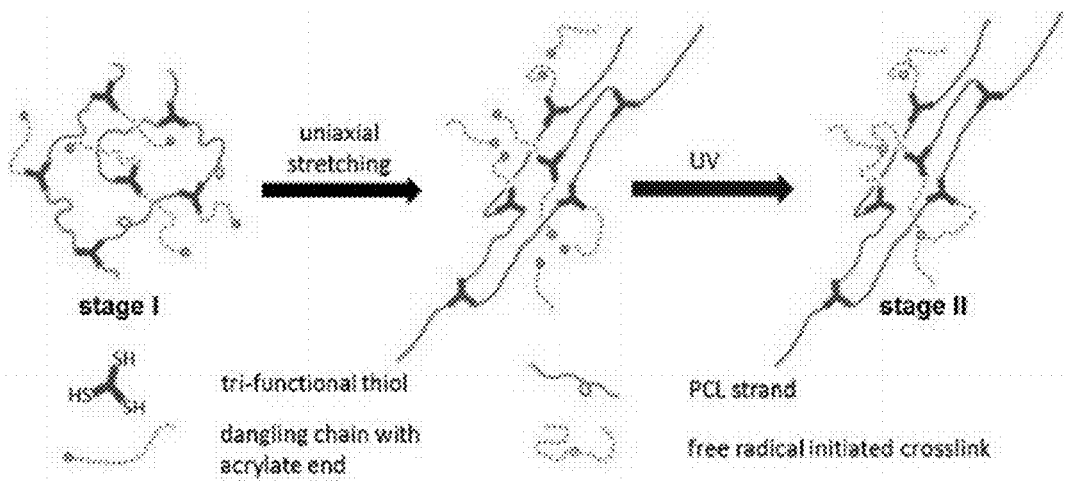
FIG. 2 is a schematic representation of the preparation of a dual-crosslinked network actuator.

The synthetic strategy relied on two orthogonal chemical reactions to achieve stage-wise introduction of covalent crosslinks at different strained states (FIG. 1 and FIG. 2). The initial network was prepared using base-catalyzed and radical-free thiol-acrylate coupling of acrylate functionalized prepolymers with multifunctional thiols (Stage I). The presence of prepolymer in stoichiometric excess leads to a known amount of unreacted and dangling acrylate end-groups. A second population of crosslinks was introduced by uniaxially stretching the melted sample to prescribed extension ratios (λ=2.0, 3.5, 5.5, 6.5, 7.5) and subsequently post-curing the stretched networks with UV irradiation (Stage II). Photo-generated free radicals initiate polymerization of the acrylate dangling ends to form new subchains that weave throughout the existing strained network.

Figure 3:
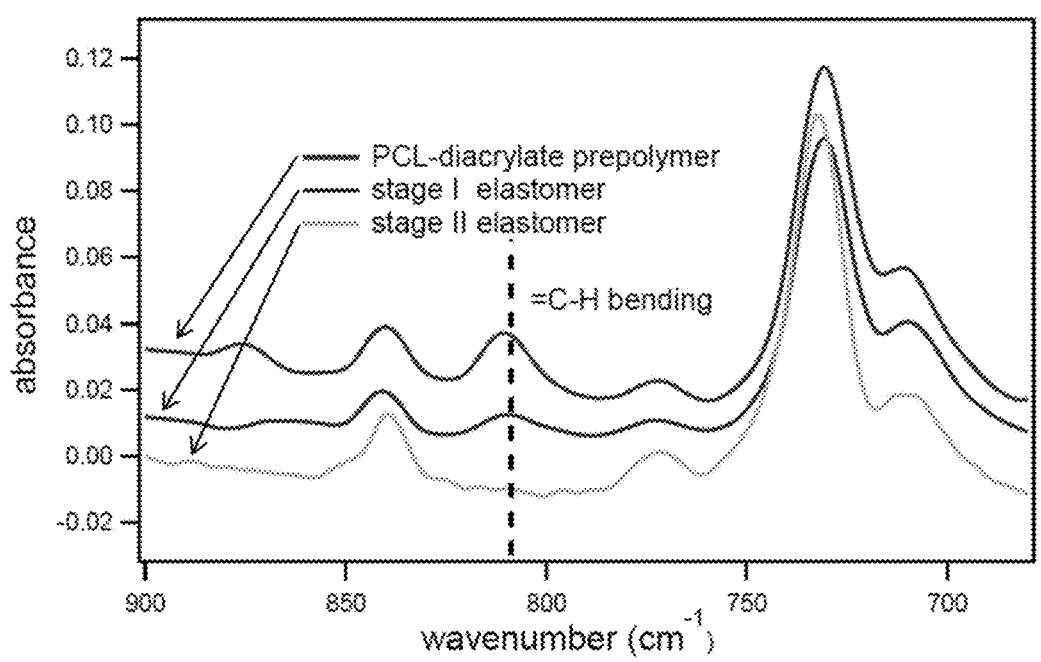
FIG. 3 displays FTIR spectra showing the decrease in =C—H bending at 810 cm$^{-1}$, suggesting consumption of acrylate groups during the two curing stages.

The stage-wise establishment of the network was confirmed through observation of acrylate end-group consumption via Fourier Transform Infrared (FT-IR) Spectroscopy (FIG. 3). FIG. 3 shows FTIR spectra of PCL-diacrylate, the partially crosslinked Stage I elastomer and the shape actuating Stage II elastomer. The absorption peak at 810 cm$^{-1}$ is characteristic of the =C—H bending from the end-group attached to the PCL chain. The decrease of this peak after Michael addition indicates that a significant amount of acrylate has been consumed, while some still remains due to the unbalanced stoichiometry between thiol and acrylate functional groups. After UV curing, the Stage II sample shows almost no absorption peak, suggesting nearly all the dangling chains with active acrylate end groups have been incorporated into the network through photo-initiated polymerization.

An intriguing aspect of this network design lies in its ability to configurationally bias chains for crystallization along a preferred direction. While there are reports of architecturally similar "double networks" where additional crosslinks were added in the deformed state (Andrews R D et al. *J Appl Phys* 1946, 17 (5), 352-361; Kramer O et al. *Macromolecules* 1974, 7 (1), 79-84; Roland C M and Warzel M L. *Rubber Chem Technol* 1990, 63 (2), 285-297; Singh N K and Lesser A J. *J Polym Sci Pol Phys* 2010, 48 (7), 778-789; Singh N K and Lesser A J. Abstracts of Papers, 241st ACS National meeting, Anaheim, Calif., Polymeric Material: Science & Engineering. 2011, 104, 387), in the present disclosure network strands are comprised of semi-crystalline PCL chains that can actively undergo stress-induced crystallization (elongation). During UV post-cross-linking, dangling ends can relax and weave through the elastically deformed network before being reacted together to form permanent bonds and entanglements that can stabilize strain within the network. Due to the newly introduced constraints, when the load is removed above $T_m$, the network is unable to retract to its original, unstrained state. Instead, the network adopts an equilibrium "state-of-ease" that balances elastic stress from the original, load-bearing network strands with the entropic stress from newly formed sub-chains. Consequently, the original network strands are configurationally biased along the pre-strain direction by an internal stress arising from new entanglement and chemical bond constraints. When cooled, this internal stress facilitates crystallization of network chains along the biased direction, further elongating the material. This effect is fully reversible and is analogous to a two-way shape-memory polymer under a constant external load.

Figure 4:
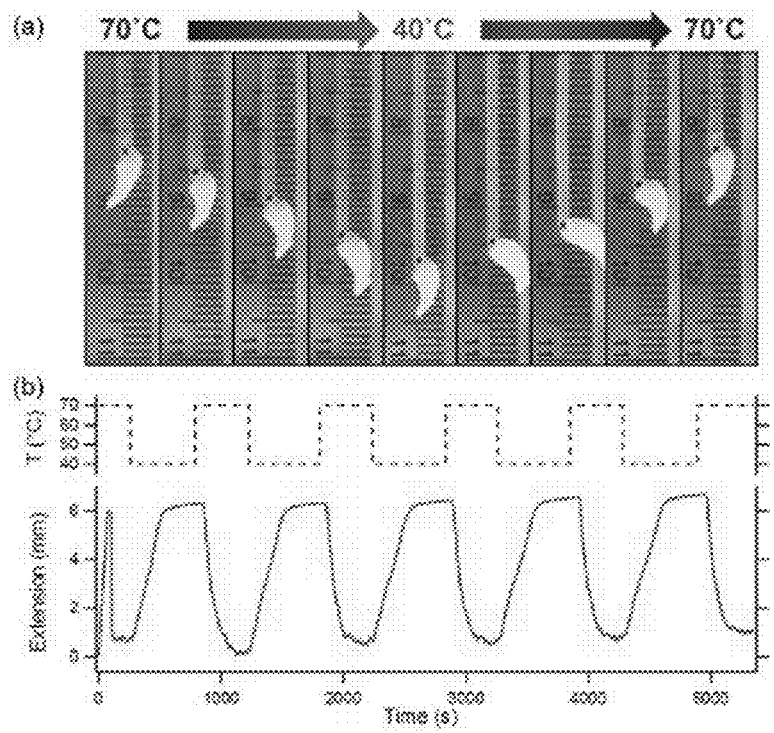
FIG. 4 displays the actuation behavior of samples crosslinked at an extension ratio of 650%.

Shape actuation of the dual-crosslinked network was evaluated using mechanical testing with temperature control and results are shown in FIG. 4. Prior to thermal cycling, all samples were deformed by a small amount (2-12%) and unloaded at 70° C. to remove any kinks that formed during film molding. After stress training the original (zero-strain) shape was nearly recovered. The small residual strain should not be ascribed to plastic deformation because it is absent in subsequent cycles. Samples were then subjected to five cooling-heating cycles between 40° C. and 70° C. with one end fixed and one end free. Upon cooling to 40° C., the specimen self-elongates, caused by the crystallization of configurationally biased PCL chains. At the plateau of a cycle's elongation, the strain data is slightly sloped, indicating that the sample was not fully crystallized within the assigned cooling period. When heated to 70° C., the sample contracted due to melting of shape-distorting crystalline domains. Shape actuation is fully reversible and is reproducible over several cycles. A dimensional change of 1.4 cm, corresponding to 17% strain, is apparent from the images in FIG. 4 for a specimen photocrosslinked at 650% strain.

All Stage I samples started with the same initial length of 10.0 mm and were strained to different extension ratios during UV curing to form Stage II elastomers. Table 1 summarizes actuation performance of resulting materials. Samples subjected to no strain showed no actuation because network subchains are not configurationally biased and crystallization occurs in all directions. The actuation performance grows with the amount of extension during Stage II curing. The strain level that allows maximum actuation (>15%) can be between 550% and 650%. The actuation performance drops when the strain is too high, possibly due to a weaker "second network" with lower crosslink density.

TABLE 1

Actuation performance of Stage II samples crosslinked at different extension ratios.

| Strain (mm/mm) | Original Length (mm) | Sample length upon UV Curing (mm) | Equilibrium Length (mm) | Actuation Length (mm) | Actuation Percentage |
|---|---|---|---|---|---|
| 0% | 10.0 | 10.0 | 10.0 | 0 | 0% |
| 200% | 10.0 | 30.0 | 26.6 | 0.3 | 1.1% |
| 350% | 10.0 | 45.0 | 38.4 | 1.4 | 3.6% |
| 550% | 10.0 | 65.0 | 46.3 | 7.0 | 15.1% |
| 650% | 10.0 | 75.0 | 47.1 | 7.0 | 14.9% |
| 750% | 10.0 | 85.0 | 52.7 | 4.0 | 7.6% |

The semicrystalline, shape-actuating networks were interrogated by wide-angle X-ray scattering (WAXS) experiments, conducted in transmission, to non-destructively probe the degree of crystallinity and the degree of orientation. Scattered intensity was recorded as a function of the scattering angle 2θ and the azimuthal angle defined as the angle between scattered radiation and the draw direction. PCL typically forms orthorhombic unit cells with polymer chains running along the crystallographic c-axis. When PCL is uniaxially stretched (cold-drawn) during crystallization, the c-axis of the unit cell aligns along the stretch direction. The (110) and (200) reflections are observed along the equator, and, for highly ordered samples, the (102) plane is observed as a weak four point pattern (Chatterjee T et al. *Adv Mater* 2007, 19 (22), 3850; Kamal T et al. *Macromolecules* 2012, 45 (21), 8752-8759). The degree of orientation can be quantified by the azimuthal variation of diffracted X-rays from the (110) plane near 2θ=21.5° using Hermans' orientation factor (Spruiell J E and White J L. *Polymer Engineering and Science* 1982, 23 (5), 247-256):

$$f_{110} = \frac{(3\langle\cos\varphi\rangle^2 - 1)}{2} \quad (1)$$

where $$\langle\cos\varphi\rangle = \frac{\int_0^\pi I_{110}(\varphi)\cos^2\varphi\sin\varphi\,d\varphi}{\int_0^\pi I_{110}(\varphi)\sin\varphi\,d\varphi} \quad (2)$$

The factor $f_{110}$ has limiting values of unity for perfect alignment, zero for random orientation, and −½ for alignment of (110) orientation vectors in the plane normal to the cold-draw direction but without preferred direction within that plane.

Figure 5:
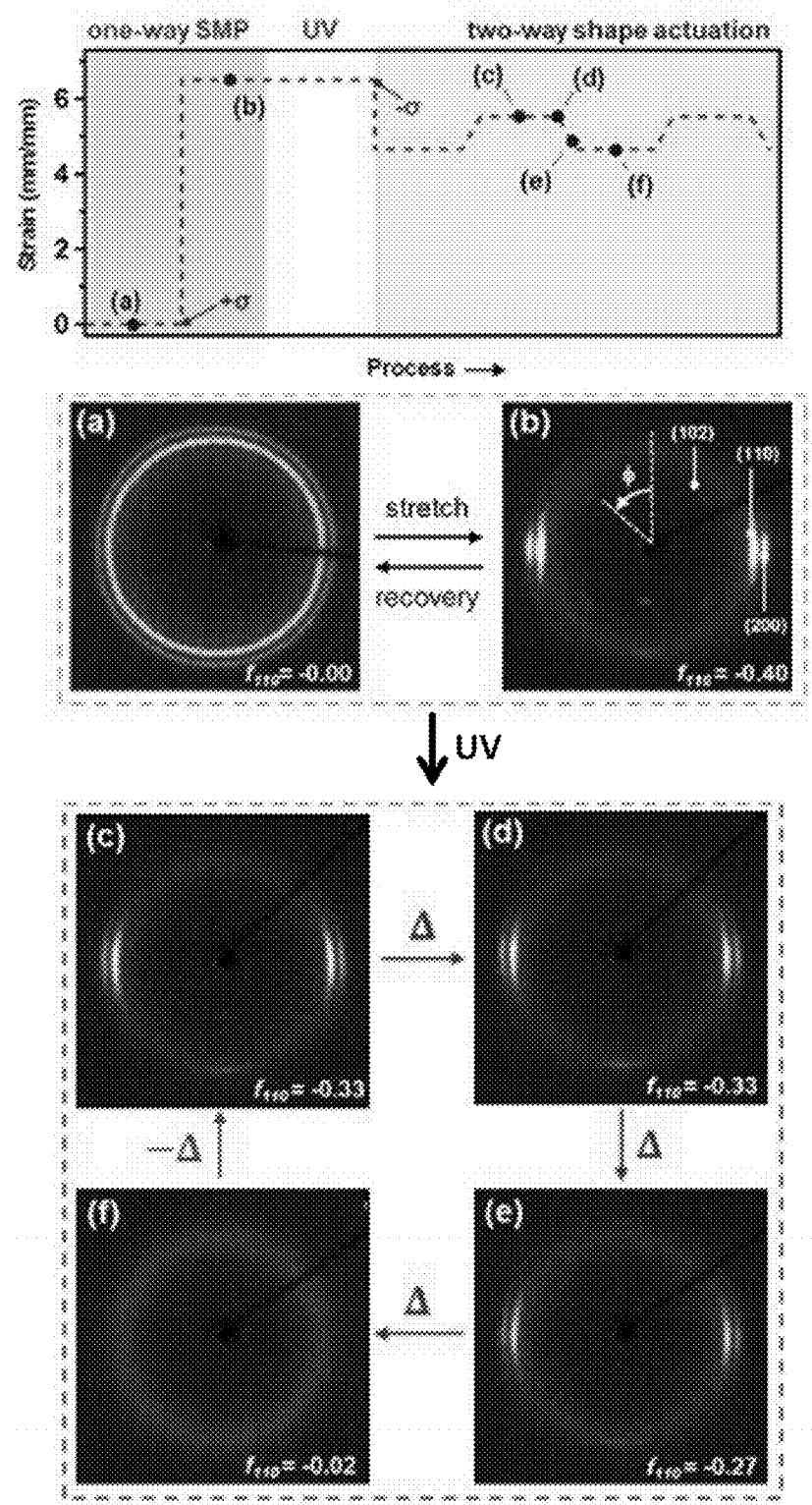
FIG. 5 displays measured sample dimensions and WAXS data illustrating how UV fixation transforms the specimen from a one-way shape-memory polymer to a two-way shape actuator. In the top panel, strain is plotted over the course of the process. Beginning at the bottom left of this panel, strain for a PCL Stage I network that is stretched to 650%, photocrosslinked, and thermally cycled without applied stress. The annotations (+σ) and (−σ) indicate when the load was applied and removed. The remaining data points indicate measured strain values and the dashed line is meant to guide the eye. Panels (a)-(f) display the evolution of WAXS patterns at different stages, as indicated in the top panel, as the material is converted from one-way shape-memory polymer to a two-way shape actuator: Panel (a) Stage I network in the unstretched state; Panel (b) Stage I network stretched to 650%; Panel (c) the network after Stage II curing—UV irradiation at 650% strain—followed by unloading and cooling to room temperature; Panels (d), (e), and (f) the same network after heating to 40° C., 55° C., and 70° C., respectively. The Herman orientation factor of the (110) planes is included in each WAXS image.

FIG. 5 shows a data-based illustration relating sample strain to PCL strand orientation at different stages of network preparation and subsequent shape-actuation. Prior to UV-irradiation, the partially crosslinked PCL network behaves as a cold-drawable shape-memory polymer that can undergo stress induced crystallization (Zotzmann J et al. *Adv Mater* 2010, 22 (31), 3424-3429; Chung T et al. *Macromolecules* 2008, 41 (1), 184-192). Mechanistically, stretching just beneath PCL's melting point reorients and disrupts crystallites and stretches network strands. Stretched network subchains have lower configurational entropy, and, consequently, new crystals form that can fix network strain. If heated above the crystal's melting point, these crystals melt and the material can elastically recover to its original shape. The WAXS pattern from the unstrained, lightly crosslinked network, containing unpolymerized dangling ends (FIG. 5, state a) displays uniform orientation arcs for the two most prominent planes, the (110) (innermost) and (200) (outermost). The lack of orientation in the unstretched sample ($f_{110}$=−0.001) originates from single isotropic scattering from the stacks of randomly oriented chain-folded lamellae. When cold-drawn to 650% (FIG. 5, state b), the scattered intensity concentrates at low angle along the meridian with $f_{110}$~−0.40, indicating large amount of lamellae oriented along the stretch direction.

Samples are transformed from a one-way shape-memory polymer to a two-way shape actuator by UV irradiation at fixed elongation above its melting point. Irradiation introduces new netpoints and converts dangling ends into elastically active subchains. The resultant specimen turned pale yellow in comparison to its previously milky white appearance due to the decomposition of loaded photo-initiator, DMPA. When unloaded the sample's extension ratio decreased and its WAXS pattern (FIG. 5, state c) exhibited somewhat reduced orientation with $f_{110}$~−0.33. In this state, the new netpoints interfere with crystallization, and dangling ends are no longer available for undisrupted crystallization. Heating the specimen from 25° C. to 40° C. (FIG. 5, state c to d) had little impact on the degree of orientation, and elongation. However, by 55° C., the scattering arcs from the oriented crystalline lamella blurred, and the sample dimension significantly shortened (FIG. 5, state e). Further heating to 70° C., well above its melting temperature, caused complete melting of PCL crystallites as indicated by disappearance of the Bragg diffraction (FIG. 5, state f). Furthermore, at 70° C. the sample further contracted to its equilibrium extension, which minimizes the total stretching free energy of all strands. Upon cooling, internal stress-induced crystallization of the dual crosslinked network occurs and the sample recovers its extended state (FIG. 5, state c), completing its stress-free two-way shape actuation cycle.

Figure 6:
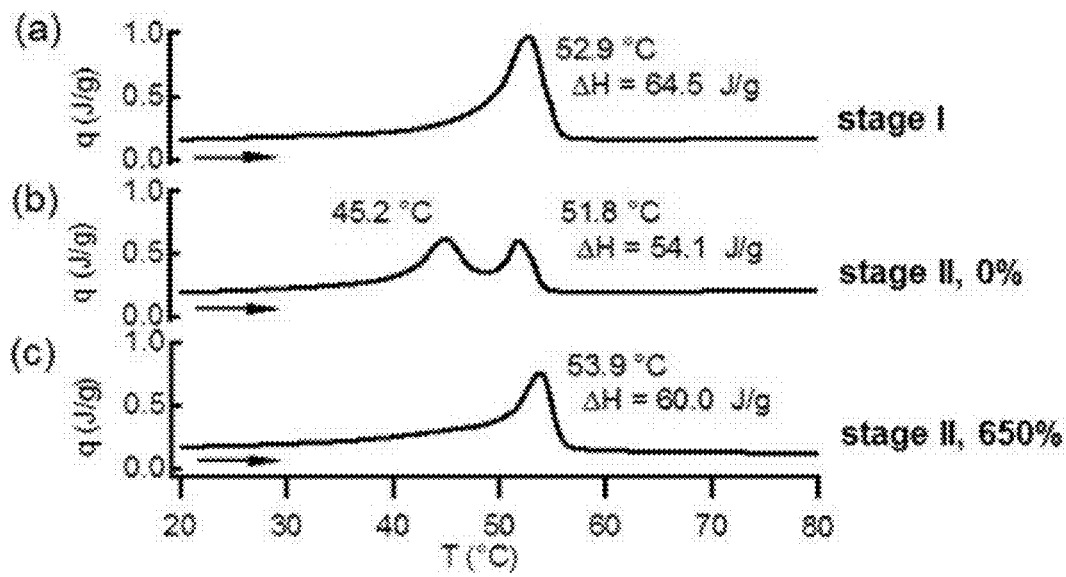
FIG. 6 displays melting endotherms from differential scanning calorimetry heating scans (5° C./min) for PCL networks with different curing routines: Scan (a) is a network following Stage I curing by thiol-acrylate coupling; Scan (b) a network following Stage II photoinduced polymerization of dangling ends in the absence of strain; and Scan (c) a network following Stage II photoinduced polymerization while subjected to 650% strain.
Figure 7:
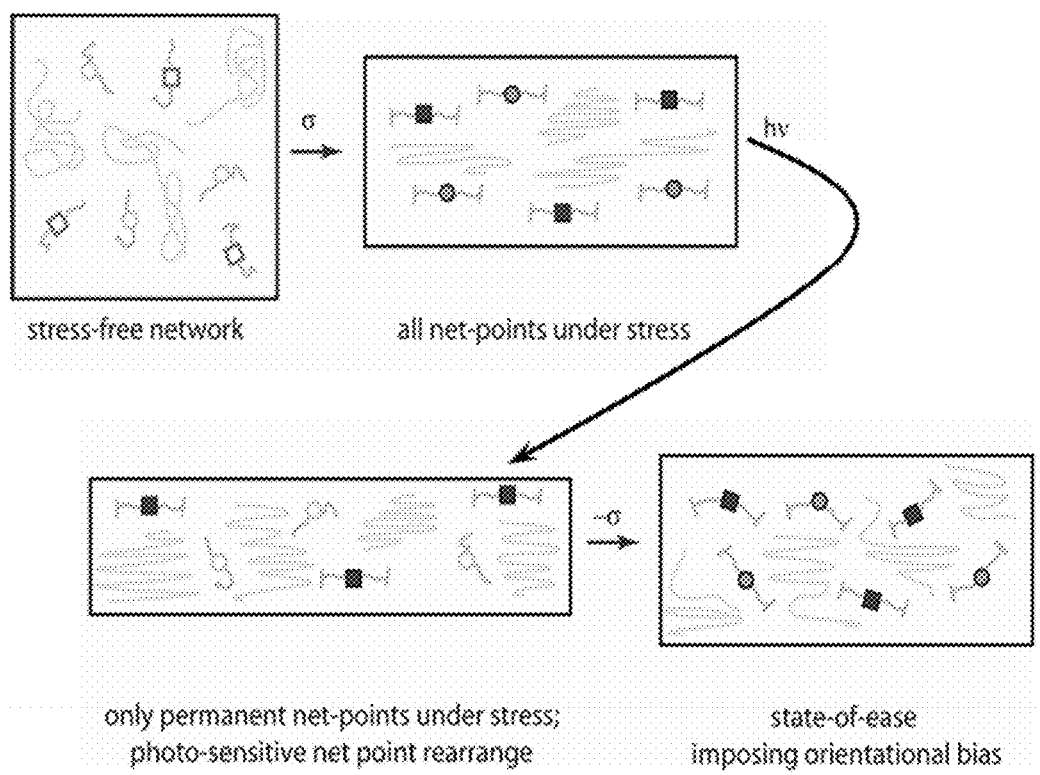
FIG. 7 displays a schematic representation of photoinduced network formation. Squares represent permanent crosslinks in their stress-free (hollow) and loaded (solid) states. Circles represent photosensitive crosslinks. A "state-of-ease" follows load release that can balance elastic stresses from the original and newly formed strands.

Differential scanning calorimetry (DSC) experiments on networks prepared using different stress-crosslinked protocols yielded further evidence of stress-induced crystallization. Prepolymers that were partially crosslinked by base-catalyzed thiol-acrylate coupling (Stage I) exhibit a single endothermic peak (FIG. 6a) which is attributed to melting of PCL crystalline domains within a network containing only trifunctional branch points. However, when the same material is crosslinked through Stage II, without applied stress, two types of crystalline domains with different stabilities are observed (FIG. 6b). The higher temperature endotherm is attributed to melting of crystalline domains made from subchains connected to trifunctional branch points; and the lower temperature endotherm is due to melting of domains made from strands connected to multifunctional branch points from free radical polymerization (Stage II). Steric crowding of chains near these branch points is believed to destabilize the crystals, and this is also reflected in the lower melting enthalpy of this sample. Samples stretched during Stage II curing also exhibit both of these peaks. However, compared to the unstretched network, these thermal transitions display somewhat larger enthalpies, and they are shifted to slightly elevated temperatures (FIG. 4(c)). The internal stress present within the dual-crosslinked networks leads to configurationally biased subchains which promote crystallization, resulting in higher melting temperatures. This is analogous to classical stress-induced crystallization (Zhao Y et al. *Macromolecules* 1999, 32 (4), 1218-1225; Floudas G et al. *Macromolecules* 2000, 33 (17), 6466-6472). Thus, the DSC data provide supporting evidence for the suggested mechanism of shape actuation.

A single-phase, poly(ϵ-caprolactone) shape actuator that reversibly shrinks and elongates along one dimension upon heating and cooling has been disclosed. To prepare the actuator: crosslinks between subchains are first introduced in the undeformed state (Stage I), and the resulting elastomer is further crosslinked, while stretched to several hundred percent, by polymerization of dangling ends containing acrylate functional groups (Stage II). The resulting network has built-in stress and anisotropy along the stretch direction, imparting a two-way shape memory effect in the absence of an external load. WAXS tests confirmed the ability of network subchains to transform between nearly isotropic coils and oriented crystals, upon thermal cycling. When cooled, the actuator elongates as crystallization further aligns PCL chains along the stretch direction; and when heated, the actuator contracts back to its state-of-ease. Thermal cycling is highly reproducible, and no evidence of mechanical creep was observed. A thermally activated, one-dimensional stress-free actuation based on a single material (instead of a composite) can benefit a range of technologies, such as biomedical devices, artificial muscles, and robotic system designs.

Example 2

A poly(caprolactone) double network can also be formed that contains two types of crosslinks or molecular junctions: permanent/covalent crosslinks and photosensitive crosslinks. In some examples, photosensitive crosslinks can also be referred herein as reversible molecular junctions. In some examples, molecular junctions can also be referred herein to as molecular linkers or linkages. The photosensitive crosslinks can have the ability to rearrange/reshuffle upon irradiation. Therefore, these networks comprising photosensitive crosslinks can, in some examples, be termed "partially photo-reconfigurable networks" or, in some examples, photo-plastic elastomers.

In this example, the partially photo-reconfigurable network comprises network strands of a semicrystalline polymer. The partially photo-reconfigurable network can then be heated above its melting point, and the material can be uniaxially deformed, elongating chains along the stretch direction. While under stress, and maintaining $T > T_m$, the material can be irradiated to cause the photosensitive crosslinks to reshuffle/reconfigure, creating new crosslinks. The new formed crosslinks can connect dangling chain-ends together, weaving through the elastically deformed network. Since the number of load-bearing network strands can be decreased upon irradiation, the sample can be further elongated when irradiated. Upon load removal, the reconfigured network can locate its "state of ease," which minimizes the total stretching free energy of all strands. Since the final, loadless shape is partially elongated (fixed by the newly formed crosslinks), some of the PCL chains remain under tensile stress. When cooled, stress-induced crystallization can occur and can further elongate the material. This effect can be reversible and is akin to a two-way shape-memory polymer under a constant load.

Figure 8:
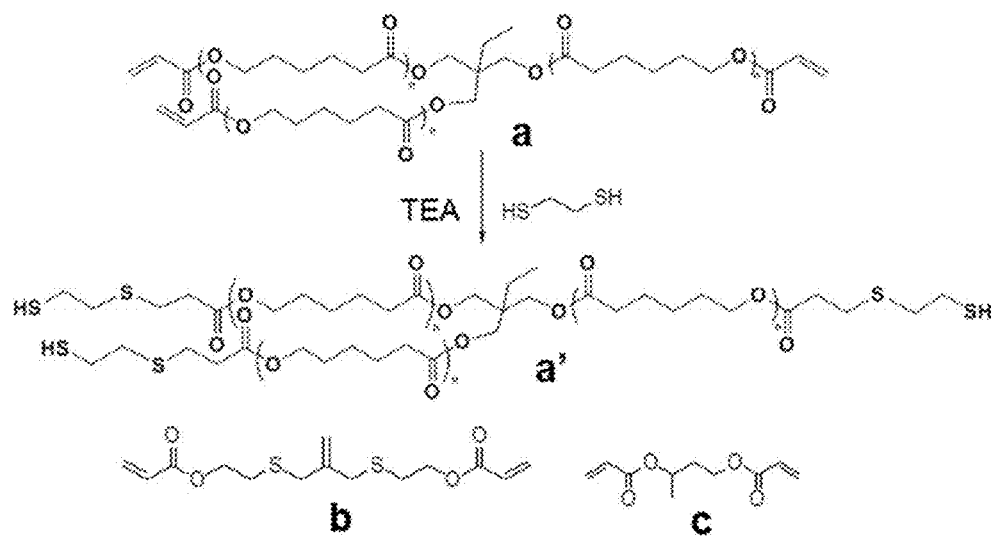
FIG. 8 displays a formulation to make a photo-reconfigurable network. The displayed chemical structures are: a) PCL-triacrylate; a') PCL-trithiol; b) 2-methylene-propane-1,3-bis(thioethyl acrylate) (MBTA); and c) 1,3-butanediol diacrylate.

FIG. 8 displays a formulation to make a photo-reconfigurable network. The displayed chemical structures are: a) PCL-triacrylate; a') PCL-trithiol; b) 2-methylene-propane-1,3-bis(thioethyl acrylate) (MBTA); and c) 1,3-butanediol diacrylate.

The structure of 2-Methylene-Propane-1,3-Bis(Thioethyl acrylate) (MBTA) is shown in panel (b) of FIG. 8, and can be synthesized as reported elsewhere (Kloxin C et al. Advanced Materials 2011, 23, 1977-1981).

The hydroxy-terminated, three-arm poly(caprolactone) (PCL-triol) was synthesized by ring-opening polymerization of caprolactone (CL) in the presence of $SnOct_2$ as a catalyst and trimethylolpropane as a tri-functional initiator. Distilled CL (40.0 g, 39 eq.), trimethylolpropane (1.208 g, 1 eq.) and $SnOct_2$ (88.8 mg, 1/40 eq.) were added to a dried, silanized 100 mL flask. The reaction was carried out neat, at 120° C., and under continuous $N_2$ purge for 24 hours. The resulting PCL polymer was purified by precipitation into methanol followed by vacuum-drying for 12 hours at 60° C. The yield was 92%. The molecular weight was determined by $^1H$ NMR end-group analysis to be 4,400 g/mol, and the molar mass dispersity from GPC was 1.17. Tri-arm PCL prepolymers with higher molecular weight were obtained using the same technique but with a greater amount of monomer feed.

The chain-ends of hydroxyl-terminated prepolymer were acrylated by nucleophilic substitution with acryloyl chloride to form a PCL-triacrylate (FIG. 8, a). Freshly distilled toluene and potassium carbonate (4.23 g, 4.5 eq.) were added to PCL-triol (30.0 g, 1 eq.) under $N_2$ at 0° C. After 30 minutes of degassing with $N_2$, acryloyl chloride (2.48 mL, 2.78 g, 4.5 eq.) was added dropwise over 15 mins. The reaction was warmed to 80° C. and allowed to stir for 48 hours. The mixture was filtered, and the liquid fraction was precipitated into methanol to afford a white powder. The product, a PCL-triacrylate (FIG. 8, a), was vacuum-dried at 60° C. overnight. The yield was 90.0%. $^1H$ NMR indicated a molecular weight of 5,000 g/mol and complete end-group conversion; GPC showed a molar mass dispersity of 1.18.

The chain-ends of acrylate-terminated prepolymer were further modified by thiol-acrylate reaction with a dithiol to form PCL-trithiols (FIG. 8, a'). For example, freshly distilled triethylamine (1 eq.) was added to PCL-triacrylate (10 g, 1 eq.) dissolved in 30 ml of toluene under $N_2$ purge. A stoichometric excess of 1,2-ethanedithiol was dissolved in 10 ml of toluene and added dropwise into the reaction flask. The reaction was carried out at room temperature for 24 hours. The mixture was precipitated into methanol to afford a white powder. The product was vacuum-dried at 60° C. overnight. The yield was 97.0%. $^1H$ NMR indicated complete end-group conversion; GPC showed molar mass dispersity of 1.18.

Crosslinked PCL networks containing both permanent crosslinks and photosensitive crosslinks were prepared by thiol-acrylate Michael addition between tri-functional PCL-trithiol and difunctional small molecule linkers (both MBTA and 1,3-butanediol diacrylate (FIGS. 8, b and c)). The thiol-acrylate coupling reaction was conducted in the presence of 4-dimethylaminopyridine (DMAP) (e.g. 1.0 wt %) as a base catalyst. Phenothiazine was added into the mixture as a radical scavenger at 0.5-0.8 wt. % to protect the reagent mixture from undue radical-induced polymerization. PCL-trithiol prepolymer and scavenger were first mixed on a glass slide using a spatula, and the mixture was melted on a hotplate at 60° C. Once a homogeneous mixture was obtained after 1-2 minutes, a stoichiometrically balanced amount of MBTA (40 mol %) and 1,3-butanediol diacrylate (60 mol %) was added carefully, and the mixture was melted again for 1-2 minutes. While melted, the finely ground base (DMAP) and photoinitiator 2,2-Dimethoxy-2-phenylacetophenone (DMPA, 1 wt %) were added and stirred into the melt for 1-2 minutes. The mixed and melted reagents were briefly degassed under vacuum at 60° C. until no bubbles were observed. The mixture was then quickly sandwiched between two glass slides that were separated by a 0.70 mm thick Teflon spacer. After assembly, the sandwich was placed in a curing oven (convection) for two days at 60° C. Following this formulation, 40% of the linkers joining the PCL subchains can contain MBTA, an allyl-sulfide containing radical-sensitive moiety, while the remaining 60% of the linkages can comprise permanent covalent bonds, being inert to radical attacks. The fraction of crosslinks that are either permanent or photosensitive can be adjusted, for example, by using different amounts of permanent and photosensitive linker groups.

Figure 9:
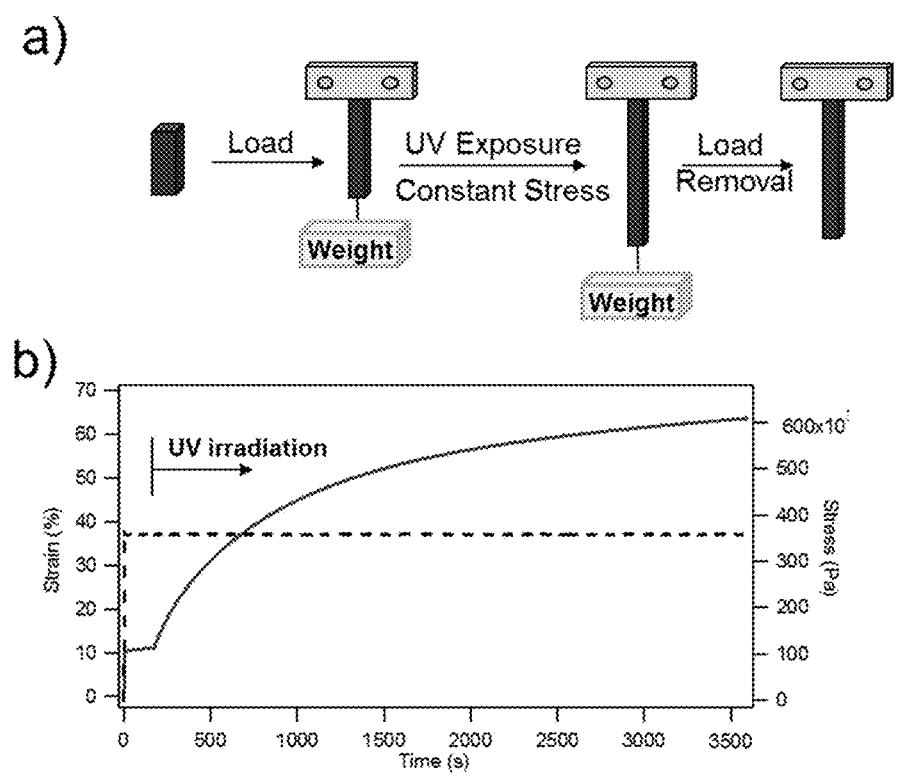
FIG. 9 shows the strain response of a photo-reconfigurable network held at constant stress while under UV exposure. Top panel (a) is cartoon illustrating the experimental protocol. Bottom panel (b) shows strain and stress plotted against time. At the experimental time of 175 s, the UV light source was turned on. The dashed line corresponds to the right axis and indicates stress.

A shape actuator can be prepared or "programmed" from a partially photo-reconfigurable network by allowing bond reconfiguration to occur while the network is placed under stress or strain. For example, FIG. 9 shows the strain response of a photo-reconfigurable network that was loaded with $360 \times 10^6$ Pa and irradiated with 365 nm light. The sample initially stretches to ~12% strain, and, when the UV irradiation source (365 nm, 45 mW/cm$^2$) is turned on, the sample experiences further elongation. The additional elongation that occurs (during irradiation) is attributed to reconfiguration of network sub-chains as the allyl sulfide photosensitive crosslinks undergo addition-fragmentation chain transfer reactions. The tension appears to approach an equilibrium strain of ~65%. The time required to approach this equilibrium strain while under constant stress and irradiation is on the order of 5,000 seconds.

Figure 10:
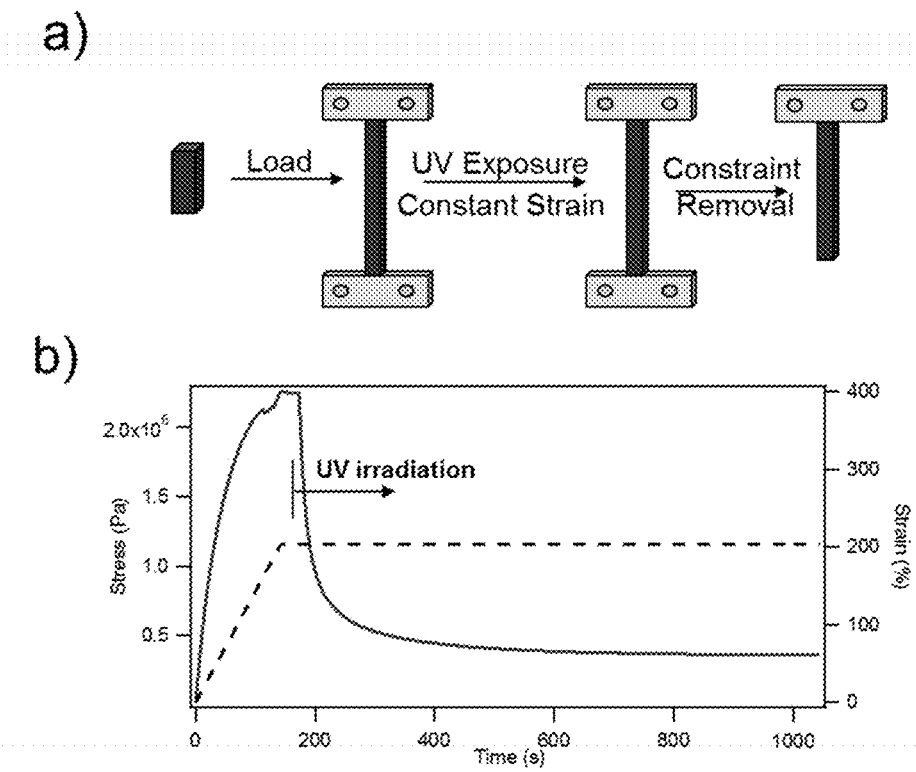
FIG. 10 shows stress relaxation of a photo-reconfigurable network held at constant strain under UV exposure. Top panel (a) is a cartoon illustrating the experimental protocol. Bottom panel (b) shows strain and stress plotted against time. At the experimental time of 175 s, the UV light source was turned on. The dashed line corresponds to the right axis and indicates strain.

Alternatively, the network can be programmed using a constant-strain protocol. FIG. 10 shows an example of a photo-reconfigurable network that is first placed under 200% tensile strain. The network elastically deforms and exhibits a tensile stress of about $2.2 \times 10^6$ Pa. The network is then irradiated while under constant strain, and the resulting asymptotic stress relaxation to a level of about $0.36 \times 10^6$ Pa is attributed to reconfiguration of network sub-chains as allyl sulfide photosensitive crosslinks undergo addition-fragmentation chain transfer reactions. The time-scale for stress relaxation while under constant strain is about 800 seconds. The time-scale for programming at constant strain was lower than the time-scale for programming at constant stress, and, therefore, the constant-strain programming method can be preferred for some applications.

Figure 11:
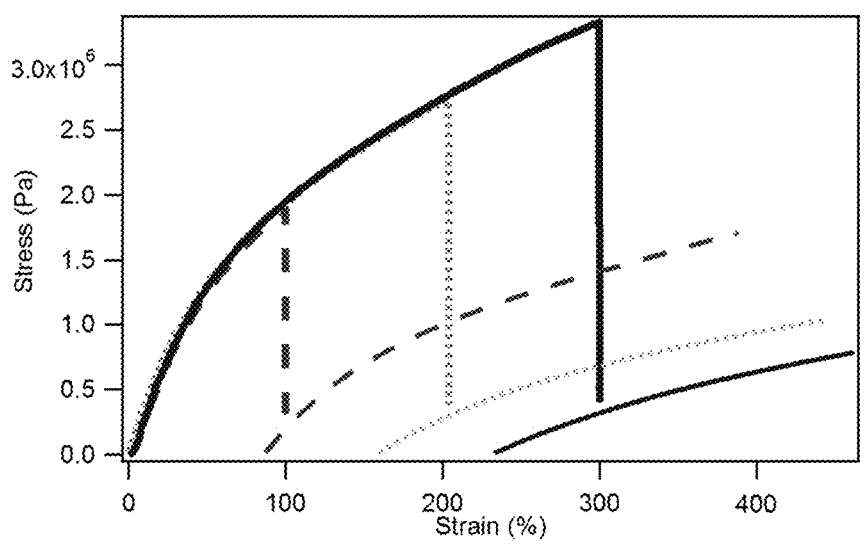
FIG. 11 displays the stress-strain behavior of three samples that were strained to different lengths (three different lines) and irradiated under constant strain. After irradiation, the load was removed and a stress-strain test was conducted from the specimen's new loadless length. The dashed line refers to the sample stretched to 100% strain and photo-programmed at that strain; the dotted line refers to the sample stretched to 200% strain; and the solid curve refers to the sample stretched to 300% strain. Strains were determined relative to the sample's original pre-stretched length.

The partially photo-reconfigurable networks can also be programmed by straining to various lengths and by exposing to different doses of UV irradiation. FIG. 11 shows the stress-strain behavior of three samples that were strained to different lengths (three different lines) and irradiated, under constant strain. Each curve reveals a different level of stress-relaxation. For example the sample strained to 200% exhibits stress relaxation from $2.7 \times 10^6$ Pa to $0.4 \times 10^6$ Pa. After allowing time for stress-relaxation under constant irradiation, the tensile stress was removed, and the samples did not return to their original shape. Instead, samples remained elongated to their programmed loadless length that represents a new "state-of-ease". The new stress-strain characteristics of the different programmed networks (from the same partially photo-reconfigurable network) are also shown in FIG. 11 but do not pass through the origin. During irradiation, a fraction of the photosensitive crosslinks were reconfigured by reversible addition-fragmentation chain transfer reactions. Network reconfiguration effectively removed stress from a population of network sub-chains. The newly formed crosslinks can connect the relaxed reactive chain-ends together, weaving through the elastically deformed network, and stabilizing the elongated state.

Figure 12:
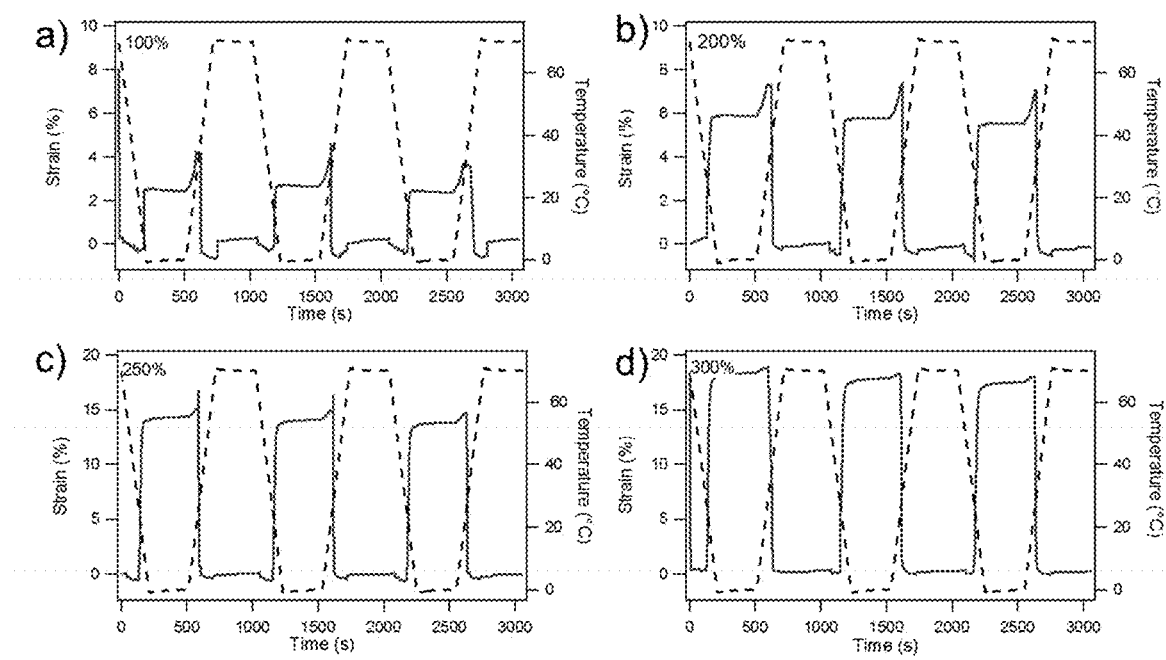
FIG. 12 displays the shape changes during heating and cooling cycles for samples that were programmed by irradiation at various strains relative to the samples' pre-stretched length. Scan (a) 100% strain, Scan (b) 200% strain, Scan (c) 250% strain, and Scan (d) 300% strain. The dashed lines correspond to the right axis and indicate temperature.

After programming by reconfiguration of the photosensitive crosslinks, the material exhibits a new loadless length that can be longer than its original length. For example, specimens in FIG. 11 show loadless lengths that are 90%, 160%, and 230% greater than the network's original length. Therefore, considering the network's newly defined state-of-ease, a fraction of network sub-chains must be under tensile stress/strain. When cooled, the configurational bias of these networks strands can enable stress/strain-induced crystallization to occur, and crystallization can cause the sample to elongate to a new length. This effect is reversible and, upon heating/melting, the sample can return to its state-of-ease loadless length in the melt. FIG. 12 shows heating and cooling cycles and the corresponding shape changes of samples that were programmed by irradiation at various strains relative to the samples' pre-stretched length: a) 100%, b) 200%, c) 250%, and d) 300%. In FIG. 12, the reported actuation strain (y-axis values) is relative to the network's loadless length in the melt state. Reversible shape changes of about 2.5%, 6%, 13%, and 19% were observed for samples programmed at 100%, 200%, 250%, and 300% respectively.

The methods and compositions of the appended claims are not limited in scope by the specific methods and compositions described herein, which are intended as illustrations of a few aspects of the claims and any methods and compositions that are functionally equivalent are within the scope of this disclosure. Various modifications of the methods and compositions in addition to those shown and described herein are intended to fall within the scope of the appended claims. Further, while only certain representative methods, compositions, and aspects of these methods and compositions are specifically described, other methods and compositions and combinations of various features of the methods and compositions are intended to fall within the scope of the appended claims, even if not specifically recited. Thus a combination of steps, elements, components, or constituents can be explicitly mentioned herein; however, all other combinations of steps, elements, components, and constituents are included, even though not explicitly stated.

What is claimed is:

1. A method of making a shape memory polymer, comprising:
    partially crosslinking a prepolymer to form a partially crosslinked polymer, wherein the prepolymer comprises a semi-crystalline polymer;
    stretching the partially crosslinked polymer to form a stretched, partially crosslinked polymer; and
    crosslinking the stretched, partially crosslinked polymer, thereby making the shape memory polymer.

2. The method of claim 1, wherein the semi-crystalline polymer comprises a polyethylene, polyethylene terephthalate, polytetrafluoroethylene, isotactic polypropylene, polyphenylene sulfide, polyetherketone, polyetheretherketone, polyphthalamide, polyetherketoneketone, thermoplastic polyimide, polybutylene terephthalate, polyoxymethylene, nylon, polyester, polyether, poly(caprolactone), or a copolymer thereof.

3. The method of claim 1, wherein the prepolymer comprises acrylate end groups and partially crosslinking the prepolymer comprises base-catalyzed Michael addition of at least a portion of the acrylate end groups of the polymer and a multifunctional thiol.

4. The method of claim 1, wherein the partially crosslinked polymer has a pre-stretched length; the stretched, partially crosslinked polymer has a post-stretched length; and the post-stretched length is from greater than 0% to 1000% longer than the pre-stretched length.

5. The method of claim 4, wherein the post-stretched length is 100% or more longer than the pre-stretched length.

6. The method of claim 1, wherein crosslinking the stretched, partially crosslinked polymer comprises a photocrosslinking reaction.

7. The method of claim 6, wherein the photocrosslinking reaction comprises photocuring with UV irradiation in the presence of a photoinitiator.

8. The method of claim 1, wherein the method occurs at a temperature above the melting temperature of the shape memory polymer.

9. The method of claim 1, wherein stretching the partially crosslinked polymer comprises applying a load to the partially crosslinked polymer, and the method further comprises removing the load from the shape memory polymer, thereby making an actuator with a loadless length.

10. The method of claim 9, wherein the partially crosslinked polymer has a pre-stretched length; the stretched, partially crosslinked polymer has a post-stretched length; and the loadless length is between the pre-stretched length and the post-stretched length.

11. The method of claim 9, further comprising cooling the actuator to a temperature below the melting temperature of the shape memory polymer, thereby elongating the actuator along the direction to an elongated length.

12. The method of claim 10, wherein the elongated length is from greater than 0% to 50% longer than the loadless length.

13. The method of claim 10, further comprising heating the actuator to a temperature above the melting temperature of the shape memory polymer, thereby contracting the actuator along the direction to the loadless length.

14. The method of claim 11, further comprising cooling the actuator to a temperature below the melting temperature of the shape memory polymer, thereby elongating the actuator along the direction to the elongated length.

15. A method of making a shape memory polymer, comprising:
    providing a semi-crystalline polymer with photosensitive crosslinks and permanent crosslinks;
    stretching and heating the semi-crystalline polymer; and
    irradiating the stretched and heated semi-crystalline polymer, to thereby reshuffle the photosensitive crosslinks.

* * * * *